(12) United States Patent
Feinson (10) Patent No.: US 10,778,905 B2
(45) Date of Patent: Sep. 15, 2020

(54) SURROUND VIDEO RECORDING (75) Inventor: Roy Feinson, Washington, DC (US)

(73) Assignee: ORB Reality LLC, Lewes, DE (US)

( * ) Notice: Subject to any disclaimer, the term of this patent is extended or adjusted under 35 U.S.C. 154(b) by 0 days.

(21) Appl. No.: 13/151,150

(22) Filed: Jun. 1, 2011

(65) Prior Publication Data

US 2012/0307068 A1 Dec. 6, 2012

(51) Int. Cl.
  *H04N 7/18* (2006.01)
  *H04N 5/247* (2006.01)
  *H04N 13/243* (2018.01)

(52) U.S. Cl.
  CPC ........... *H04N 5/247* (2013.01); *H04N 13/243* (2018.05)

(58) Field of Classification Search
  CPC .... H04N 5/2251; H04N 5/2252; H04N 5/247; H04N 21/21805
  USPC ......................................................... 348/159
  See application file for complete search history.

(56) References Cited

U.S. PATENT DOCUMENTS

| | | | | |
|---|---|---|---|---|
| 4,724,449 A * | 2/1988 | Wright | ................... | G03B 35/04 396/324 |
| 2002/0063775 A1* | 5/2002 | Taylor | .................. | H04N 5/2627 348/48 |
| 2002/0085219 A1* | 7/2002 | Ramamoorthy | ....... | H04N 19/46 358/1.9 |
| 2002/0170064 A1* | 11/2002 | Monroe | ............. | H04N 21/6405 725/105 |
| 2004/0227855 A1* | 11/2004 | Morel | ...................... | H04N 5/04 348/512 |
| 2005/0207487 A1* | 9/2005 | Monroe | ........... | G08B 13/19628 375/240.01 |

OTHER PUBLICATIONS http://multianglevideo.com/online-player/.

* cited by examiner

*Primary Examiner* — Obafemi O Sosanya
(74) *Attorney, Agent, or Firm* — Arjomand Law Group, PLLC (57) ABSTRACT

A method and a system are disclosed including multiple Image Acquisition Devices (IAD), such as cameras, simultaneously, consecutively, or independently filming a scene, each IAD having a known position with respect to each of the other IADs. Each image data stream obtained from each IAD may be uniquely identified, by the position of the IAD or by a unique identifier, to allow selective real-time display and/or playback of each individual image data stream under the control of a user. Depending on the position of an IAD, the image data stream collected by the IAD represents a corresponding viewing angle to the user. Thus, the user may dynamically select a different viewing angle for the same scene by selecting a corresponding image stream during real-time viewing and/or playback. In various embodiments, multiple image streams of the same scene may be selected and viewed simultaneously to provide a 3-Dimensional effect or other visual effects.

21 Claims, 7 Drawing Sheets

SURROUND VIDEO RECORDING

TECHNICAL FIELD

This application relates generally to video recording. More specifically, this application relates to surround video recording using multiple cameras as separately playable data streams.

BRIEF DESCRIPTION OF THE DRAWINGS

The drawings, when considered in connection with the following description, are presented for the purpose of facilitating an understanding of the subject matter sought to be protected.

DETAILED DESCRIPTION

While the present disclosure is described with reference to several illustrative embodiments described herein, it should be clear that the present disclosure should not be limited to such embodiments. Therefore, the description of the embodiments provided herein is illustrative of the present disclosure and should not limit the scope of the disclosure as claimed. In addition, while following description references video cameras, it will be appreciated that the disclosure may be used with other types of image acquisition, such as films, ultrasound, Magnetic Resonance Imaging (MRI), and the like.

Briefly described, a device and a method are disclosed, including multiple Image Acquisition Devices (IAD), such as cameras, simultaneously, consecutively, or independently filming a scene, each IAD having a known position with respect to each of the other IADs. Each image data stream obtained from each IAD may be uniquely identified, by the position of the IAD or by a unique identifier, to allow selective real-time display and/or playback (for pre-recorded image streams) of each individual image data stream under the control of a user. Depending on the position of an IAD, the image data stream collected by the IAD represents a corresponding viewing angle to the user. Thus, the user may select a different viewing angle for the same scene by selecting a corresponding image stream during real-time viewing and/or playback. In various embodiments, the user may change the selection of an image stream dynamically while viewing a recorded scene. In some embodiments the user can program the viewing device to show the scenes from different available angles based on predetermined criteria, such as change of the scene angle every few minutes, based on scene content, or based on a timeline of the video. In various embodiments, multiple image streams of the same scene may be selected and viewed simultaneously to provide a 3-Dimensional (3D) effect or other visual effects. In some embodiments not all angles are available for all the scenes and in other embodiments the arrangements of the IADs may be different from scene to scene.

In one embodiment, when a scene has had, for example, 16 "takes," a scene from take #1 of a camera A at angle A may be played back with a scene from take No. 8 of camera B at angle B. In yet another embodiment the same camera or a separate camera may be used to record a scene played specifically for angle A and another scene played specifically for angle B. However, the users remain unaware of such schemes and will have the illusion that the recording of all angles were done simultaneously.

Over the years, many image recording technologies and techniques have been developed ranging from black and white chemical film strips without sound to digital video recorders, which record color digital images directly to hard disks. Such techniques have included stereo recording, which entails using two synchronized cameras to film a scene simultaneously to be later viewed by a user as a 3D image.

In few viewing situations users have the ability to interact with the film content being played. Generally, user interactions have been very limited including picture adjustment, color adjustment, moving forward and backward (for example, when using DVD players) in the film stream, and the like. The user is generally not able to change the user's viewing angle of the same scene while watching a film, in effect, interacting with the visual content of the film.

Illustrative Operating Environment

Figure 1:
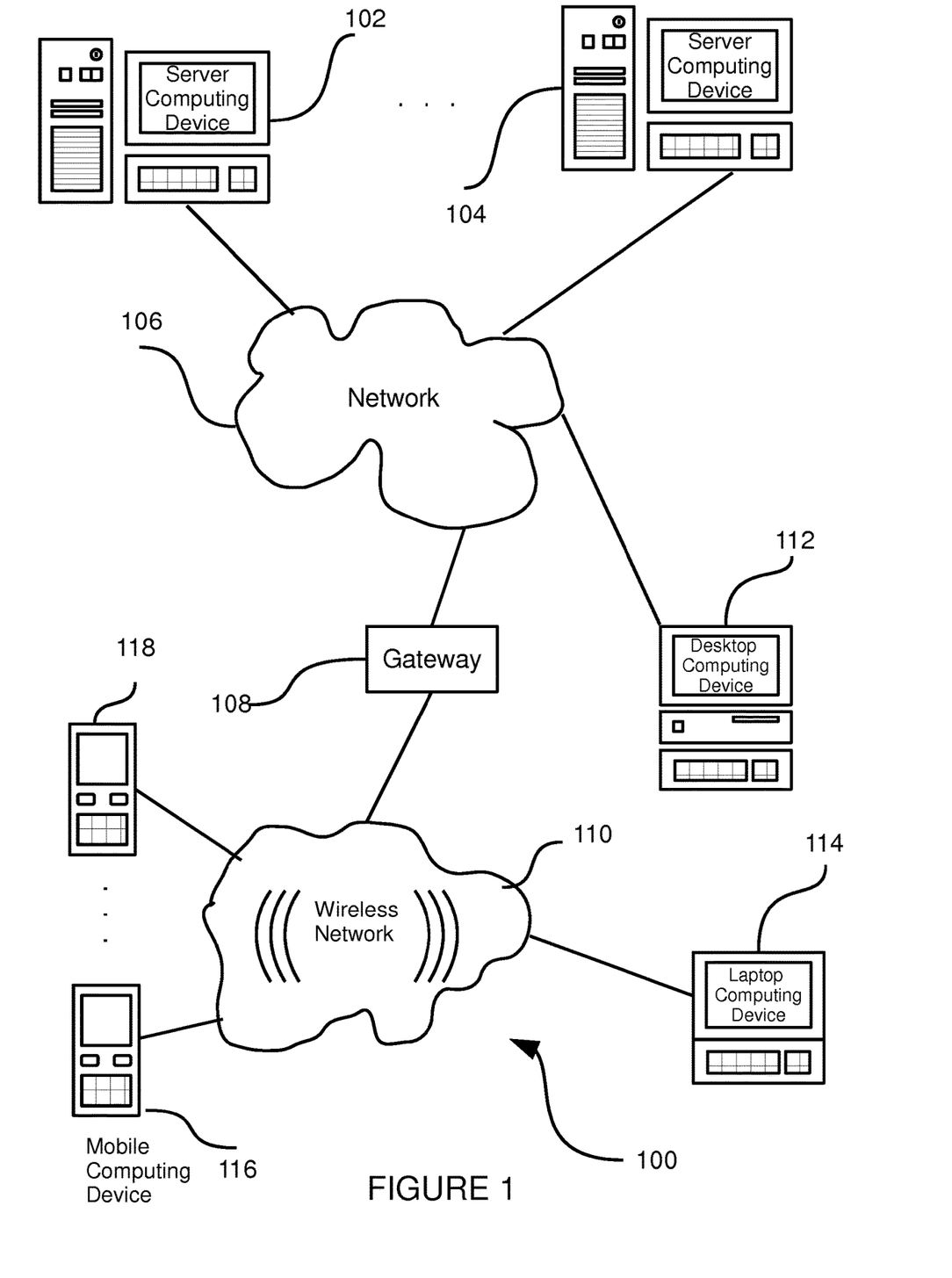
FIG. 1 shows an embodiment of a network computing environment wherein the disclosure may be practiced.

FIG. 1 shows components of an illustrative environment in which the disclosure may be practiced. Not all the shown components may be required to practice the disclosure, and variations in the arrangement and type of the components may be made without departing from the spirit or scope of the disclosure. System 100 may include Local Area Networks (LAN) and Wide Area Networks (WAN) shown collectively as Network 106, wireless network 110, gateway 108 configured to connect remote and/or different types of networks together, client computing devices 112-118, and server computing devices 102-104.

One embodiment of a computing device usable as one of client computing devices 112-118 is described in more detail below with respect to FIG. 2. Briefly, however, client computing devices 112-118 may include virtually any device capable of receiving and sending a message over a network, such as wireless network 110, or the like. Such devices include portable devices such as, cellular telephones, smart phones, display pagers, radio frequency (RF) devices, music players, digital cameras, infrared (IR) devices, Personal Digital Assistants (PDAs), handheld computers, laptop computers, wearable computers, tablet computers, integrated devices combining one or more of the preceding devices, or the like. Client device 112 may include virtually any computing device that typically connects using a wired communications medium such as personal computers, multiprocessor systems, microprocessor-based or programmable consumer electronics, network PCs, or the like. In one embodiment, one or more of client devices 112-118 may also be configured to operate over a wired and/or a wireless network.

Client devices 112-118 typically range widely in terms of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphic may be displayed.

A web-enabled client device may include a browser application that is configured to receive and to send web pages, web-based messages, or the like. The browser application may be configured to receive and display graphic, text, multimedia, or the like, employing virtually any web based language, including a wireless application protocol messages (WAP), or the like. In one embodiment, the browser application may be enabled to employ one or more of Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send information.

Client computing devices 112-118 also may include at least one other client application that is configured to receive content from another computing device, including, without limit, server computing devices 102-104. The client application may include a capability to provide and receive textual content, multimedia information, or the like. The client application may further provide information that identifies itself, including a type, capability, name, or the like. In one embodiment, client devices 112-118 may uniquely identify themselves through any of a variety of mechanisms, including a phone number, Mobile Identification Number (MIN), an electronic serial number (ESN), mobile device identifier, network address, such as IP (Internet Protocol) address, Media Access Control (MAC) layer identifier, or other identifier. The identifier may be provided in a message, or the like, sent to another computing device.

Client computing devices 112-118 may also be configured to communicate a message, such as through email, Short Message Service (SMS), Multimedia Message Service (MMS), instant messaging (IM), internet relay chat (IRC), Mardam-Bey's IRC (mIRC), Jabber, or the like, to another computing device. However, the present disclosure is not limited to these message protocols, and virtually any other message protocol may be employed.

Client devices 112-118 may further be configured to include a client application that enables the user to log into a user account that may be managed by another computing device. Such user account, for example, may be configured to enable the user to receive emails, send/receive IM messages, SMS messages, access selected web pages, download scripts, applications, or a variety of other content, or perform a variety of other actions over a network. However, managing of messages or otherwise accessing and/or downloading content, may also be performed without logging into the user account. Thus, a user of client devices 112-118 may employ any of a variety of client applications to access content, read web pages, receive/send messages, or the like. In one embodiment, for example, the user may employ a browser or other client application to access a web page hosted by a Web server implemented as server computing device 102. In one embodiment, messages received by client computing devices 112-118 may be saved in non-volatile memory, such as flash and/or PCM, across communication sessions and/or between power cycles of client computing devices 112-118.

Wireless network 110 may be configured to couple client devices 114-118 to network 106. Wireless network 110 may include any of a variety of wireless sub-networks that may further overlay stand-alone ad-hoc networks, and the like, to provide an infrastructure-oriented connection for client devices 114-118. Such sub-networks may include mesh networks, Wireless LAN (WLAN) networks, cellular networks, and the like. Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), $4^{th}$ (4G), generation and any future generation technologies for radio access for cellular systems, WLAN, Wireless Router (WR) mesh, and the like. Access technologies such as 3G, 4G, and future access networks may enable wide area coverage for mobile devices, such as client devices 114-118 with various degrees of mobility. For example, wireless network 110 may enable a radio connection through a radio network access such as Global System for Mobil communication (GSM), General Packet Radio Services (GPRS), Enhanced Data GSM Environment (EDGE), WEDGE, Bluetooth, High Speed Downlink Packet Access (HSDPA), Universal Mobile Telecommunications System (UMTS), Wi-Fi, Zigbee, Wideband Code Division Multiple Access (WCDMA), and the like. In essence, wireless network 110 may include virtually any wireless communication mechanism by which information may travel between client devices 102-104 and another computing device, network, and the like.

Network 106 is configured to couple one or more servers depicted in FIG. 1 as server computing devices 102-104 and their respective components with other computing devices, such as client device 112, and through wireless network 110 to client devices 114-118. Network 106 is enabled to employ any form of computer readable media for communicating information from one electronic device to another. Also, network 106 may include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another.

Communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. Network 106 may include any communication method by which information may travel between computing devices. Additionally, communication media typically may enable transmission of computer-readable instructions, data structures, program modules, or other types of content, virtually without limit. By way of example, communication media includes wired media such as twisted pair, coaxial cable, fiber optics, wave guides, and other wired media and wireless media such as acoustic, RF, infrared, and other wireless media.

Illustrative Computing Device Configuration

Figure 2:
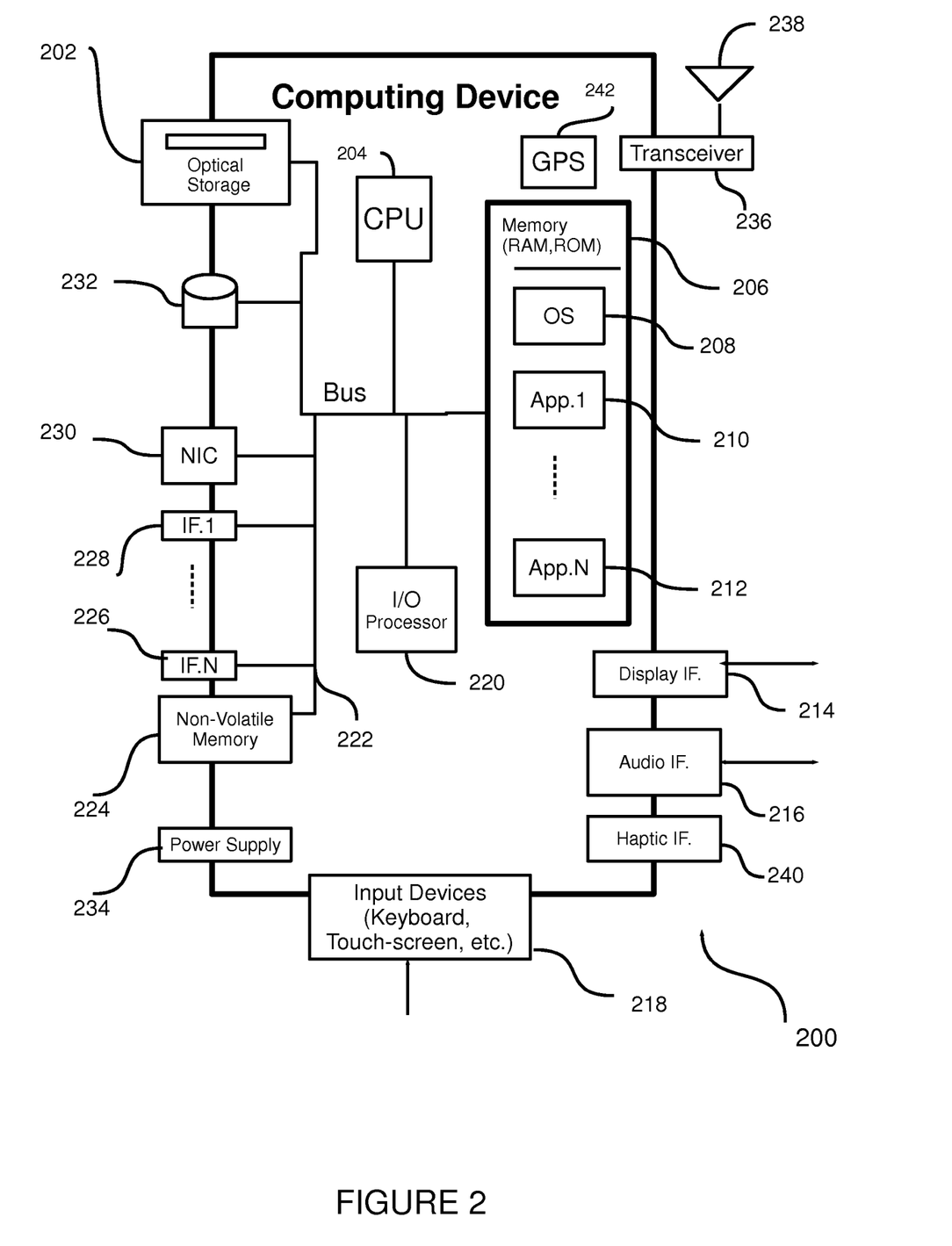
FIG. 2 shows an embodiment of a computing device that may be used in the network computing environment of FIG. 1.

FIG. 2 shows an illustrative computing device 200 that may represent any one of the server and/or client computing devices shown in FIG. 1. A computing device represented by computing device 200 may include less or more than all the components shown in FIG. 2 depending on the functionality needed. For example, a mobile computing device may include the transceiver 236 and antenna 238, while a server computing device 102 of FIG. 1 may not include these components. Those skilled in the art will appreciate that the scope of integration of components of computing device 200 may be different from what is shown. As such, some of the components of computing device 200 shown in FIG. 2 may be integrated together as one unit. For example, NIC 230 and transceiver 236 may be implemented as an integrated unit. Additionally, different functions of a single component may be separated and implemented across several components instead. For example, different functions of I/O processor 220 may be separated into two or more processing units.

With continued reference to FIG. 2, computing device 200 includes optical storage 202, Central Processing Unit (CPU) 204, memory module 206, display interface 214, audio interface 216, input devices 218, Input/Output (I/O) processor 220, bus 222, non-volatile memory 224, various other interfaces 226-228, Network Interface Card (NIC) 320, hard disk 232, power supply 234, transceiver 236, antenna 238, haptic interface 240, and Global Positioning System (GPS) unit 242. Memory module 206 may include software such as Operating System (OS) 208, and a variety of software application programs 210-212. Computing device 200 may also include other components not shown in FIG. 2. For example, computing device 200 may further include an illuminator (for example, a light), graphic interface, and portable storage media such as USB drives. Computing device 200 may also include other processing units, such as a math co-processor, graphics processor/accelerator, and a Digital Signal Processor (DSP).

Optical storage device 202 may include optical drives for using optical media, such as CD (Compact Disc), DVD (Digital Video Disc), and the like. Optical storage devices 202 may provide inexpensive ways for storing information for archival and/or distribution purposes.

Central Processing Unit (CPU) 204 may be the main processor for software program execution in computing device 200. CPU 204 may represent one or more processing units that obtain software instructions from memory module 206 and execute such instructions to carry out computations and/or transfer data between various sources and destinations of data, such as hard disk 232, I/O processor 220, display interface 214, input devices 218, non-volatile memory 224, and the like.

Memory module 206 may include RAM (Random Access Memory), ROM (Read Only Memory), and other storage means, mapped to one addressable memory space. Memory module 206 illustrates one of many types of computer storage media for storage of information such as computer readable instructions, data structures, program modules or other data. Memory module 206 may store a basic input/output system (BIOS) for controlling low-level operation of computing device 200. Memory module 206 may also store OS 208 for controlling the general operation of computing device 200. It will be appreciated that OS 208 may include a general-purpose operating system such as a version of UNIX, or LINUX™, or a specialized client communication operating system such as Windows Mobile™, or the Symbian® operating system. OS 208 may, in turn, include or interface with a Java virtual machine (JVM) module that enables control of hardware components and/or operating system operations via Java application programs.

Memory module 206 may further include one or more distinct areas (by address space and/or other means), which can be utilized by computing device 200 to store, among other things, applications and/or other data. For example, one area of memory module 206 may be set aside and employed to store information that describes various capabilities of computing device 200, a device identifier, and the like. Such identification information may then be provided to another device based on any of a variety of events, including being sent as part of a header during a communication, sent upon request, or the like. One common software application is a browser program that is generally used to send/receive information to/from a web server. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web based languages may also be employed. In one embodiment, using the browser application, a user may view an article or other content on a web page with one or more highlighted portions as target objects.

Display interface 214 may be coupled with a display unit (not shown), such as liquid crystal display (LCD), gas plasma, light emitting diode (LED), or any other type of display unit that may be used with computing device 200. Display units coupled with display interface 214 may also include a touch sensitive screen arranged to receive input from an object such as a stylus or a digit from a human hand. Display interface 214 may further include interface for other visual status indicators, such Light Emitting Diodes (LED), light arrays, and the like. Display interface 214 may include both hardware and software components. For example, display interface 214 may include a graphic accelerator for rendering graphic-intensive outputs on the display unit. In one embodiment, display interface 214 may include software and/or firmware components that work in conjunction with CPU 204 to render graphic output on the display unit.

Audio interface 216 is arranged to produce and receive audio signals such as the sound of a human voice. For example, audio interface 216 may be coupled to a speaker and microphone (not shown) to enable communication with a human operator, such as spoken commands, and/or generate an audio acknowledgement for some action.

Input devices 218 may include a variety of device types arranged to receive input from a user, such as a keyboard, a keypad, a mouse, a touchpad, a touch-screen (described with respect to display interface 214), a multi-touch screen, a microphone for spoken command input (describe with respect to audio interface 216), and the like.

I/O processor 220 is generally employed to handle transactions and communications with peripheral devices such as mass storage, network, input devices, display, and the like, which couple computing device 200 with the external world. In small, low power computing devices, such as some mobile devices, functions of the I/O processor 220 may be integrated with CPU 204 to reduce hardware cost and complexity. In one embodiment, I/O processor 220 may the primary software interface with all other device and/or hardware interfaces, such as optical storage 202, hard disk 232, interfaces 226-228, display interface 214, audio interface 216, and input devices 218.

An electrical bus 222 internal to computing device 200 may be used to couple various other hardware components, such as CPU 204, memory module 206, I/O processor 220, and the like, to each other for transferring data, instructions, status, and other similar information.

Non-volatile memory 224 may include memory built into computing device 200, or portable storage medium, such as USB drives that may include PCM arrays, flash memory including NOR and NAND flash, pluggable hard drive, and the like. In one embodiment, portable storage medium may behave similarly to a disk drive. In another embodiment, portable storage medium may present an interface different than a disk drive, for example, a read-only interface used for loading/supplying data and/or software.

Various other interfaces 226-228 may include other electrical and/or optical interfaces for connecting to various hardware peripheral devices and networks, such as IEEE 1394 also known as FireWire, Universal Serial Bus (USB), Small Computer Serial Interface (SCSI), parallel printer interface, Universal Synchronous Asynchronous Receiver Transmitter (USART), Video Graphics Array (VGA), Super VGA (SVGA), HDMI (High Definition Multimedia Interface), and the like.

Network Interface Card (NIC) 230 may include circuitry for coupling computing device 200 to one or more networks, and is generally constructed for use with one or more communication protocols and technologies including, but not limited to, Global System for Mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, Bluetooth, Wi-Fi, Zigbee, UMTS, HSDPA, WCDMA, WEDGE, or any of a variety of other wired and/or wireless communication protocols.

Hard disk 232 is generally used as a mass storage device for computing device 200. In one embodiment, hard disk 232 may be a Ferro-magnetic stack of one or more disks forming a disk drive embedded in or coupled to computing device 200. In another embodiment, hard drive 232 may be implemented as a solid-state device configured to behave as a disk drive, such as a flash-based hard drive. In yet another embodiment, hard drive 232 may be a remote storage accessible over network interface 230 or another interface 226, but acting as a local hard drive. Those skilled in the art will appreciate that other technologies and configurations may be used to present a hard drive interface and functionality to computing device 200 without departing from the spirit of the present disclosure.

Power supply 234 provides power to computing device 200. A rechargeable or non-rechargeable battery may be used to provide power. The power may also be provided by an external power source, such as an AC adapter or a powered docking cradle that supplements and/or recharges a battery.

Transceiver 236 generally represents transmitter/receiver circuits for wired and/or wireless transmission and receipt of electronic data. Transceiver 236 may be a stand-alone module or be integrated with other modules, such as NIC 230. Transceiver 236 may be coupled with one or more antennas for wireless transmission of information.

Antenna 238 is generally used for wireless transmission of information, for example, in conjunction with transceiver 236, NIC 230, and/or GPS 242. Antenna 238 may represent one or more different antennas that may be coupled with different devices and tuned to different carrier frequencies configured to communicate using corresponding protocols and/or networks. Antenna 238 may be of various types, such as omni-directional, dipole, slot, helical, and the like.

Haptic interface 240 is configured to provide tactile feedback to a user of computing device 200. For example, the haptic interface may be employed to vibrate computing device 200, or an input device coupled to computing device 200, such as a game controller, in a particular way when an event occurs, such as hitting an object with a car in a video game.

Global Positioning System (GPS) unit 242 can determine the physical coordinates of computing device 200 on the surface of the Earth, which typically outputs a location as latitude and longitude values. GPS unit 242 can also employ other geo-positioning mechanisms, including, but not limited to, triangulation, assisted GPS (AGPS), E-OTD, CI, SAI, ETA, BSS or the like, to further determine the physical location of computing device 200 on the surface of the Earth. It is understood that under different conditions, GPS unit 242 can determine a physical location within millimeters for computing device 200. In other cases, the determined physical location may be less precise, such as within a meter or significantly greater distances. In one embodiment, however, a mobile device represented by computing device 200 may, through other components, provide other information that may be employed to determine a physical location of the device, including for example, a MAC address.

Figure 3:
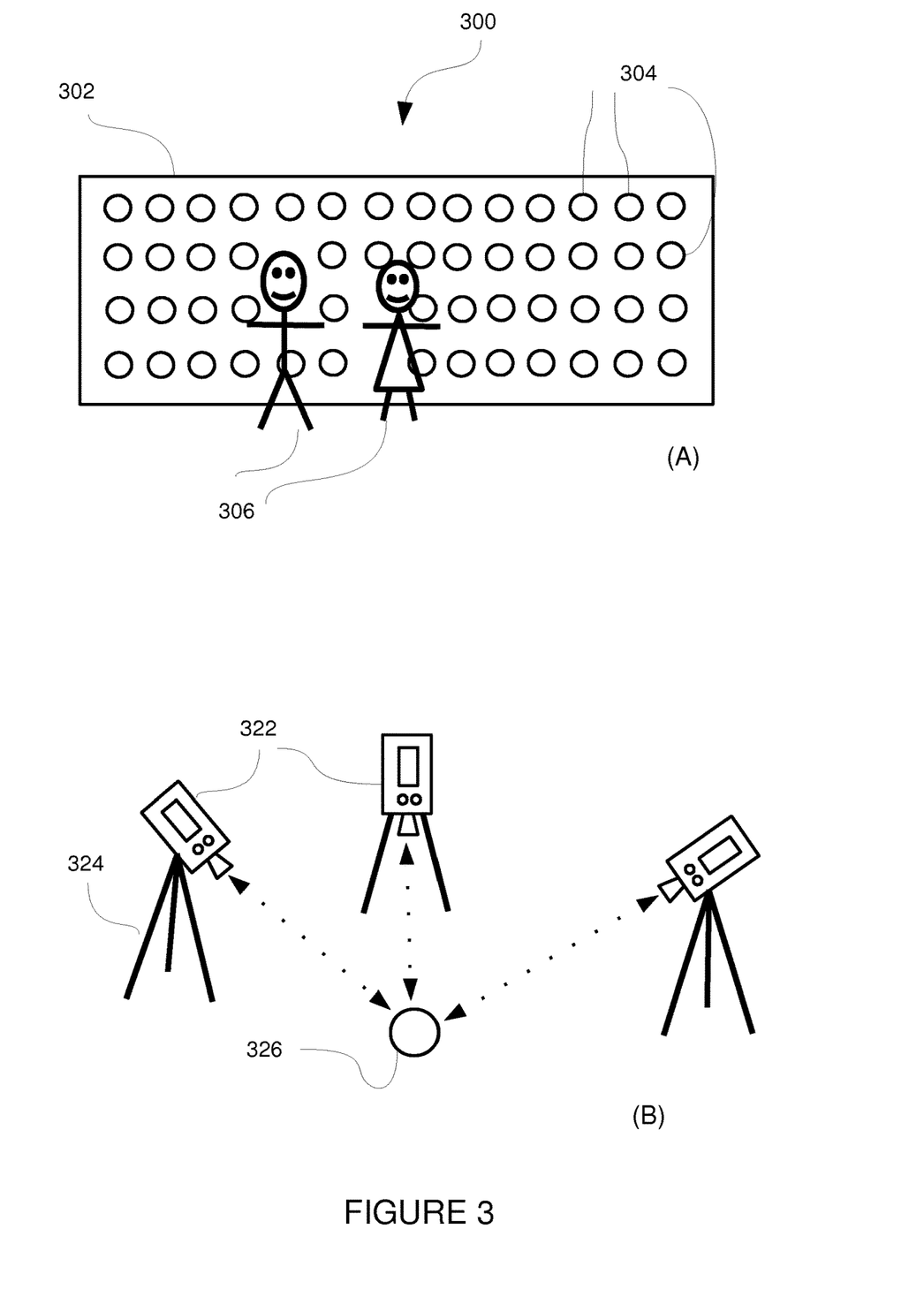
FIG. 3A shows an example surround filming mounting matrix configured to film a scene.
FIG. 3B shows an example surround filming apparatus with independently positioned cameras configured to film a scene.

FIG. 3A shows an example surround filming mounting matrix configured to film a scene. In various embodiments, a surround video recording arrangement 300 includes IAD (Image Acquisition Device) mounting matrix 302 is used to support and position many IADs 304, on the order of 10's, 100's, or more IADs to record a scene 306. In another embodiment the many IADs 304 are stand-alone IADs and are not mounted on a mounting matrix.

In various embodiments, scene 306 is recorded simultaneously using multiple IADs, each IAD recording the same scene from a different angle. In some embodiments, the IADs may be synchronized to start recording the scene at the same time, while in other embodiments, the recorded scene may be post synchronized on a frame number and/or time basis. In yet another embodiment at least two of the IADs may record the scenes consecutively. Each IAD generates an independent image stream of the same scene, but from a different angle compared with other IADs, depending on the IAD's position in mounting matrix 302. The image streams obtained independently may be tagged for identification and integrated into one multi-stream video allowing dynamic user selection of each of the image streams during viewing.

In various embodiments, multiple IADs are positioned sufficiently close to each other to allow substantially visually smooth transition between IAD image streams at viewing time, real-time or prerecorded, when the viewer/user selects a different viewing angle. For example, at viewing time, when a user moves a viewing angle of a scene using a control device, such as a joystick, from left to right of the scene, the image stream smoothly changes, showing the scene from the appropriate angle, as if the user himself is walking around the scene and looking at the scene from different angles.

Each independent image stream may be viewed separately in real-time or be recorded for later viewing based on a user's selection of the independent image stream. In general, the user will not be aware of the fact that the independent image streams may not have been recorded simultaneously. In various embodiments, the independent image streams may be electronically mixed together to form a single composite signal for transmission and/or storage, from which a user-selected image stream may be separated by electronic techniques, such as frequency filtering and other similar signal processing methods. Such signal processing techniques include both digital and analog techniques depending on the type of signal.

In various embodiments, multiple image streams may be combined into a multi-stream video, each stream of which is selectable and separable from the multi-stream video at playback time. The multi-stream video may be packaged as a single video file or as multiple files usable together as one subject video. An end user may purchase a DVD including the multi-stream video for viewing with variable angles under the user's control. Alternatively, the user may download, stream, or otherwise obtain and view the multi-stream video with different viewing angles under his control. The user may be able to download or stream only the angle-recordings he/she wants to view later on.

In various embodiments, after filming is complete, the videos from each camera or IAD may be transferred to a computer hard drive or other similar storage device. In some embodiments, IADs acquire an analog image stream, while in other embodiments, IADs acquire a digital image stream. Analog image streams may be digitized prior to storage on digital storage devices, such as computer hard disks. In some embodiments, each image stream or video may be labeled or tagged with a number or similar identifier corresponding to the IAD from which the image stream was obtained in the mounting matrix. Such identifier may generally be mapped to a viewing angle usable by a user during viewing.

In various embodiments, the image stream identifier is assigned by the IAD itself. In other embodiments, the identifier is assigned by a central controller, further described below with respect to FIG. 5. In still other embodiments, the image streams may be independently recorded by each IAD, such as a complete video camera, on a separate medium, such as a tape, and be tagged later manually or automatically during integration of all image streams into a single multi-stream video.

In various embodiments, mounting matrix 302 may be a curved, spherical, or flat mounting system constructed from wood, plastic, metal, or a combination thereof, providing a framework for housing a matrix of IADs mounted to the outside (scene facing side) of the mounting matrix with lenses pointing inward to a center of the curved matrix. It is possible to provide 360° coverage of a scene by encasing the actors in a spherical mounting matrix completely covered with cameras. In some embodiments, mounting matrix is dynamically movable, for example, by being assembled on a wheeled platform, to follow a scene during active filming.

When a mounting matrix covering more than 180° of the subject scene is employed, one problem that may arise is that some cameras, along with the mounting matrix itself, become visible to some of the other cameras. To resolve this problem, the mounting matrix may be painted blue or green, or some other distinctive color, which is different from human skin color. Such distinct background screen colors may be easily removed in post-processing and replaced with digital scenery. The camera lenses or IADs may also be visible through recording ports. However, because of their distinctive and repetitive shapes and positions, they may be automatically recognized by software and digitally removed from the scene. In other embodiments the cameras may be camouflaged in the scenes.

Similarly to camera lenses discussed above, in the case of a spherical, or near spherical mounting matrix used to encase the subject scene during filming, lighting may be supplied through a series of small holes in the mounting matrix. Because of their regularity of placement, shape and luminosity, these lights may also be easily automatically recognized and removed in post production.

In other various embodiments, mounting matrix 302 is not used. These embodiments are further described below with respect to FIG. 3B.

In some embodiments, each IAD is a standalone independent camera, while in other embodiments, each IAD is an image sensor in a network arrangement coupled to a central recording facility, further described below with respect to FIG. 5. In still other embodiments, an IAD is a lens for collecting light and transmitting to one or more image sensors via an optical network, such as a fiber optic network. In still other embodiments, IADs may be a combination of one or more of the above.

In various embodiments, the image streams generated by the IADs are pre-synchronized prior to the commencement of recording a scene. Such pre-synchronization may be performed by starting the recording by all the IADs simultaneously, for example, by a single remote control device sending a broadcast signal to all IADs. In other embodiments, the IADs may be coupled to each other to continuously synchronize the start of recording and their respective frame rates while operating. Such continuous synchronization between IADs may be performed by using various techniques, such as using a broadcast running clock signal, using a digital message passing bus, and the like, depending on the complexity and functionality of the IADs.

In other embodiments, the image streams generated by the IADs are post-synchronized, after the recording of the scene. The object of synchronization is to match up the corresponding frames in multiple image streams, which are recorded from the same scene, from different angles, but at substantially the same time. Post synchronization may be done using various techniques, such as time-based techniques, frame-based techniques, content matching, and the like.

In various embodiments, in time-based techniques, a global timestamp is used on each image stream and the corresponding image frames are matched together based on their respective timestamps. In frame-based techniques, a frame count from a starting common frame position on all image streams is used to match up subsequent image frames in the image stream. For example, the starting common frame may include an initial one or few frames of a special scene recorded for this purpose, such as a striped pattern. In content-matching techniques, elements of image frame contents may be used to match up corresponding frames. Those skilled in the art will appreciate that other methods for post-synchronization may be used without departing from the spirit of the present disclosures.

In various embodiments, the surround video recording arrangement may be completely integrated with current 3D recording and/or viewing technology by employing an offset between IADs recording the same scene, which are positioned a predetermined distance apart from each other. Because image streams from different IADs are user selectable during viewing, an enhanced or exaggerated 3D effect may be effected by selecting image streams from IADs, which were farther away from each other during recording than cameras used in a normal 3D stereo recording set slightly apart, usually about the distance between human eyes. This dynamic selectability of image streams provides a variable 3D feature while viewing a scene. Recently, 3D video and movies have been rapidly becoming ubiquitous and a "4-D" surround video, where a 3D image may also be viewed from different angles dynamically, further enhances this trend.

While generally it may not be necessary to employ multiple sound tracks in a surround video recording system, and a single master sound track may generally suffice, if each IAD or camera on the mounting matrix included an attached or built-in microphone, and the soundtracks for each image stream were switched with the corresponding image stream, a surround-sound effect, which in effect moves the sound along with the camera view, may be achieved through a single playback speaker, in contrast to traditional surround sound systems, which need multiple speakers. For example, in a conversation scene, as image streams are selected from corresponding camera positions, which were closer to a particular actor during filming, the actor's voice would be heard louder than an image stream corresponding to a camera farther away from the actor.

Those skilled in the art will appreciate that the surround video system may be applied to still images instead of full motion videos. Using still cameras in the mounting matrix, a user may "move around" objects photographed by the system by changing the photographed viewing angle.

In various embodiments, the surround video system may be used to address video pirating problems. A problem confronted by media producers is that content may be very easily recorded by a viewer/user and disseminated across the Internet. Multiple image streams provided by the surround video system may be extremely difficult to pirate and still provide the entire interactive viewing experience. While it would be possible for a pirate to record and disseminate a single viewing stream, there is no simple way to access the entire set of camera angles that make up the surround video experience.

In various embodiments, the surround video system may be used to reduce the number of "takes" or repeated recordings of the same scene, for example, in the filming of a movie, by providing simultaneous multiple takes with multiple cameras providing the director of the film with multiple options to select from.

FIG. 3B shows an example surround filming apparatus with independently positioned cameras configured to film a scene. In some embodiments, instead of using one integrated mounting matrix, independently positioned IADs 322, such as video cameras, are deployed on independent supports 324, such as tripods, to record a scene 326. In such embodiments, which may be employed in filming large areas, such as outdoor scenes, IADs may be positioned at arbitrary points around the subject scene for recording a film substantially simultaneously or consecutively. Synchronization may be performed post image acquisition on different image streams so obtained. The various IAD positions may be specified with respect to each other, using various techniques, such as using GPS, 3D grid-based specification, metes and bounds, and the like. Generally, knowing the physical location and the direction of the line of sight of an IAD, allows the determination of the angle or direction of viewing of the subject scene.

FIG. 4A shows an example camera mounting matrix configured to directly couple with cameras. In various embodiments, mounting matrix 402 is used to position and hold multiple recording devices 406, having lenses 408 exposed to a scene through predetermined recording ports 404, collectively forming a recording surface 410.

One function of mounting matrix 402 is to provide a housing structure for the cameras or other recording devices, which are mounted in a predetermined or regular pattern, close enough together to facilitate smooth transitioning between image streams during viewing. The shape of the mounting matrix modifies the user experience during playback. The ability to transform the shape of the mounting matrix based on the scene to be filmed, allows different recording angles and thus, different playback experiences.

In various embodiments, mounting matrix 402 is structurally rigid enough to reliably and stably support multiple recording devices 406, yet flexible enough to curve around the subject scene to provide a surround effect with different viewing angles of the same subject scene, as further described below with respect to FIGS. 6A and 6B. In various embodiments, mounting matrix 402 may be a substantially rectangular plain, which may flex in two different dimensions of its plane, for example, horizontally and vertically, to surround the subject scene from side to side (horizontal) or from top to bottom (vertical). In other various embodiments, mounting matrix 402 may be a plane configurable to take various planar shapes, such as spherical, semi-spherical, or other 3D planar shapes. In these embodiments, recording surface 410 substantially follows the shape of the plane of mounting matrix 402.

FIG. 4B shows an example camera mounting matrix configured to couple with cameras via sliders. In various embodiments, mounting matrix 422 includes multiple recording ports 424 in the mounting matrix through which recording devices 426 may be positioned via sliding rod 434 as indicated by arrow 432. Recording devices 426 may have lenses 428, which collectively form and specify recording plane 430.

In various embodiments, recording devices 426 are positioned at a predetermined distance from their respective recording ports 424 to define an arbitrary contour for recording plane 430 independently and distinctly from the plane of mounting matrix 422. This is in contrast to the embodiment of FIG. 4A, in which the contour of the recording surface was substantially the same as the plane of the mounting matrix. Such arrangement may be useful in close-up filming of a scene where sharp angles may exist, which may substantially preclude an effective surround filming using a broad and smooth curvature possible with the embodiment of FIG. 4A.

Those skilled in the art will appreciate that other recording device positioning techniques may be used without departing from the spirit of the present disclosures. For example, a randomly positionable arm may be used to position a corresponding recording device at a predetermined position in 3D space. Such positions may be determined relative to the 3D position of other recording devices filming the same scene.

Figure 5:
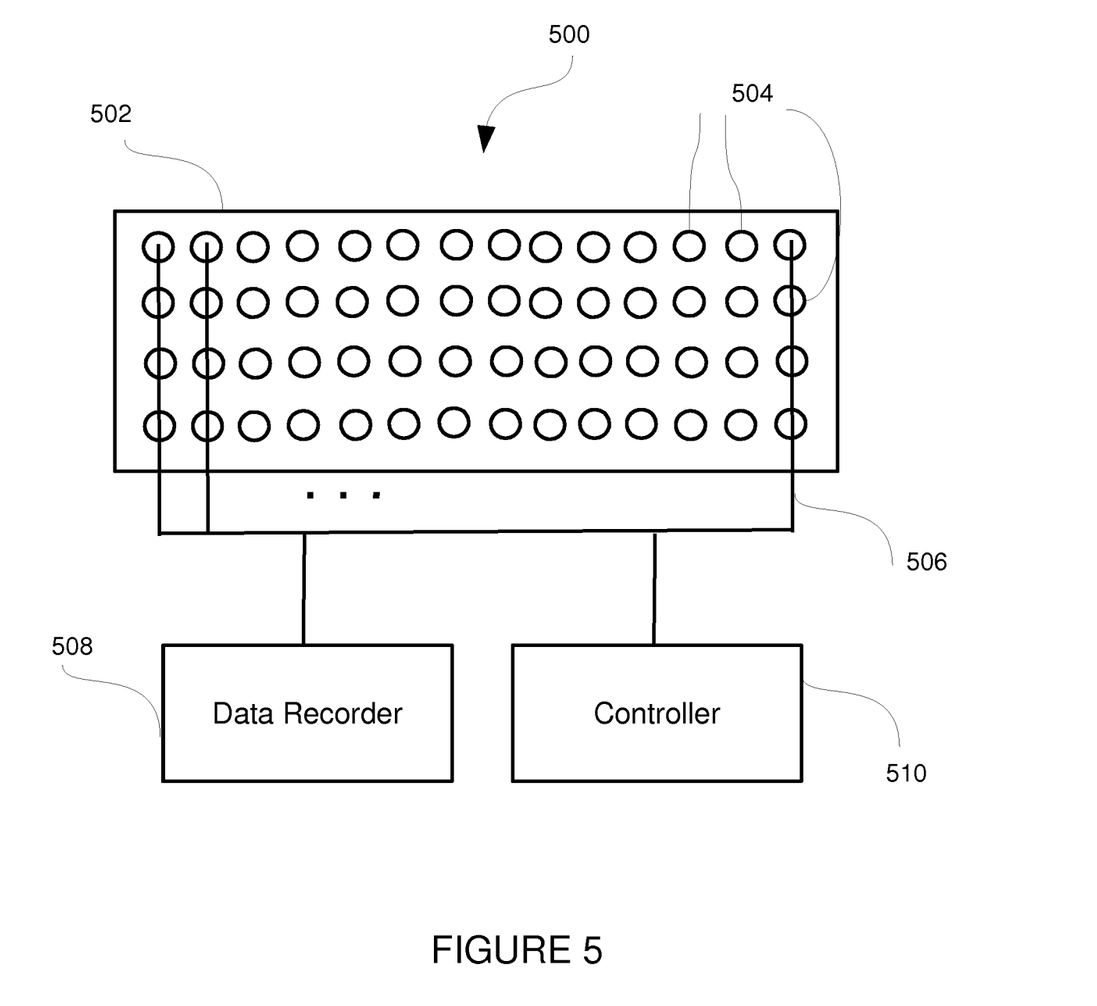
FIG. 5 shows an example surround filming screen configured to collect and transmit visual data via a data network.

FIG. 5 shows an example surround filming screen configured to collect and transmit visual data via a data network. In various embodiments, surround recording arrangement 500 includes mounting matrix 502 having multiple recording ports 504, each corresponding to an IAD coupled to other IADs via network link 506 leading to a central data recorder 508. In some embodiments, the operation of the IADs, such as start, stop, zoom, pan, and the like are controlled manually or by software from central controller 510. In some embodiments, central controller 510 controls both the IADs and the mounting matrix. For example, the shape of the mounting matrix may be changed by the central controller tensioning a cable, as further described with respect to FIGS. 6A and 6B below, or the mounting matrix may be moved around the scene on wheels by remote control.

Using complete IADs or recording devices, such as video cameras, for each recording port in the mounting matrix may be too expensive and physically bulky and heavy for some applications. In various embodiments, IADs may be image sensors only, without other recording apparatus for permanently recording the image streams acquired by the IADs. Such image sensors are electronic devices, such as CMOS (Complementary Metal Oxide Semiconductor) chips, which capture an image in a small time interval, the integration time, on the order of a few microseconds to a few milliseconds, depending on chip technology, lighting, temperature, and other conditions. Those skilled in the art will appreciate that integration time may be smaller or larger than the range indicated herein without departing from the spirit of the present disclosures.

In other various embodiments, IADs may be mere light transmitters, such as fiber optic elements, which collect light reflecting from an object in a scene and transmit the light to corresponding image sensors to be integrated and subsequently permanently recorded on a recording medium, such as a tape, if desired.

In various embodiments, network 506 may be used to transmit image data from each IAD to central data recorder 508. In some embodiments, each IAD in the mounting matrix is strobed or enabled in a predetermined order to collect and send image data during a time-slice of a particular duration, such as a few milliseconds, for recording and/or real-time display. Image data coming from various IADs during their respective time slices may then be integrated and assembled into separate continuous image streams corresponding to each IAD, as described with respect to other embodiments above. If the IADs are strobed or scanned fast enough, their respective image streams assembled from their respective time slices appear substantially continuous for human viewing. In other various embodiments, IADs coupled via network 506 may be addressed or enabled individually in random order under program control. In such embodiments, only a subset of IADs, in contrast to all IADs, may be dynamically selected for recording during filming, without the need for offline equipment setup, depending on the scene.

In the embodiments described with respect to FIG. 5, surround recording arrangement 500 use resources efficiently and avoid unnecessary duplication of hardware, such as whole cameras, save bulk, and provide ease of transportation and setup of equipment. Additionally, these embodiments provide dynamic reconfiguration of equipment without the need for lengthy, expensive, and cumbersome equipment re-setup. The cost savings in equipment, transportation, and setup may also be significant. Furthermore, because of the relatively smaller sizes of IADs consisting of only image sensors or fiber optic elements, the IADs may be packed closer together for smoother transition between image streams. The images transmitted via network 506 may also be recorded remotely, for example, via high speed wireless or wired Internet, further saving equipment cost and setup. In some embodiments, mounting matrix 502 may be in the form of a recording fabric including fiber optic elements or tiny cameras as discrete points woven into the fabric, which adds to the flexibility of application and placement of the mounting matrix. Such a recording fabric may be produced with less cost, be more reusable, and be more flexible in more applications and scenes.

Figure 6:
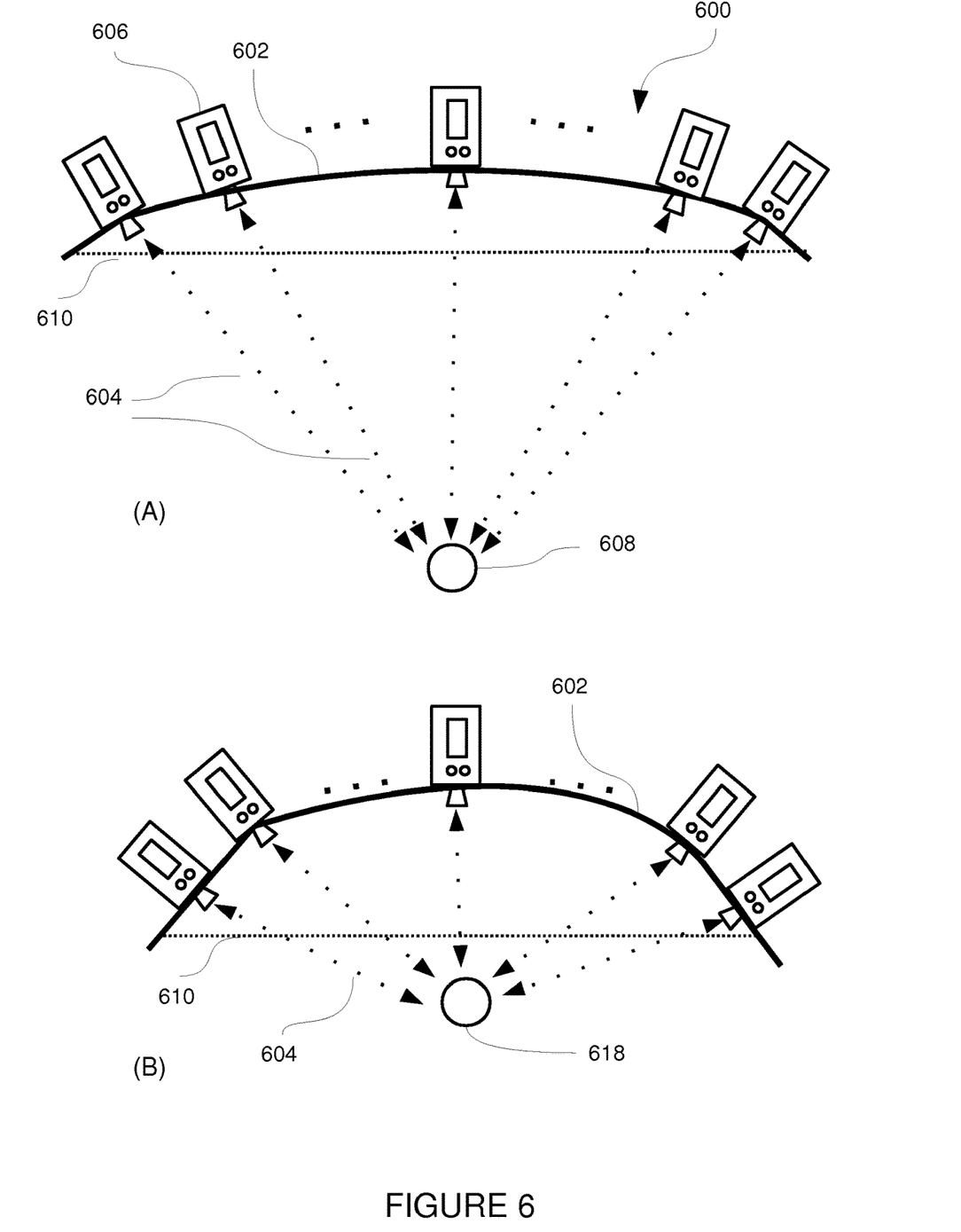
FIG. 6A shows an example camera mounting matrix adjusted for relatively far focal point.
FIG. 6B shows an example camera mounting matrix adjusted for relatively close focal point.

FIG. 6A shows an example camera mounting matrix adjusted for relatively far focal point. In various embodiments, surround recording arrangement 600 includes mounting matrix 602 made from a flexible substrate supporting IADs 606 and a control cable 610 coupled with mounting matrix 602 to control lines of sights 604 of IADs 606 and focal point or area 608 of all IADs. The subject scene is generally positioned in focal area 608 for filming.

In various embodiments, the shape of the flexible mounting matrix is altered by tensioning control cable 610 to flex and increase the curvature of the mounting matrix. In some embodiments, the tensioning of the cable may be done manually, while in other embodiments, the tensioning may be done under program control via a central controller. Those skilled in the art will appreciate that the control cable may be attached to the flexible mounting matrix in many ways. For example, opposite corners of the mounting matrix may be coupled to the control cable, pulleys may be employed to control the direction and amount of tension, and the like. When the control cable is tensioned (or loosened) to a particular setting, the curvature of the mounting matrix will change accordingly, resulting in a different 'focal length' (distance between focal area and mounting matrix) and focal area for the mounting matrix as a whole. The focal length is selected at the distance from the subject scene that gives the most realistic or otherwise desired wrap-around effect.

FIG. 6B shows an example camera mounting matrix adjusted for relatively close focal point. FIG. 6B shows substantially the same arrangement as FIG. 6A, but with a greater curvature in the mounting matrix, a shorter focal length, and a closer focal area 618, resulting from the increased tension in control cable 610.

Figure 4:
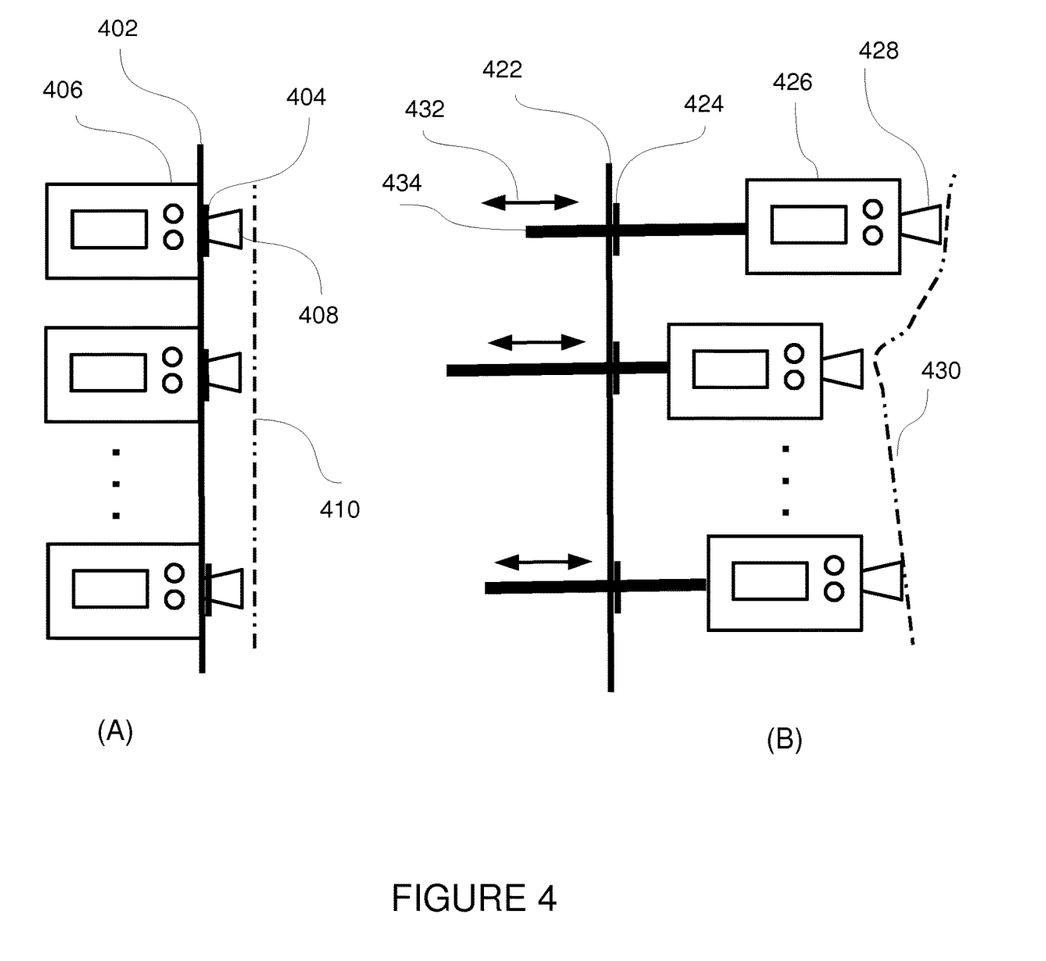
FIG. 4A shows an example camera mounting matrix configured to directly couple with cameras.
FIG. 4B shows an example camera mounting matrix configured to couple with cameras via sliders.
Figure 7:
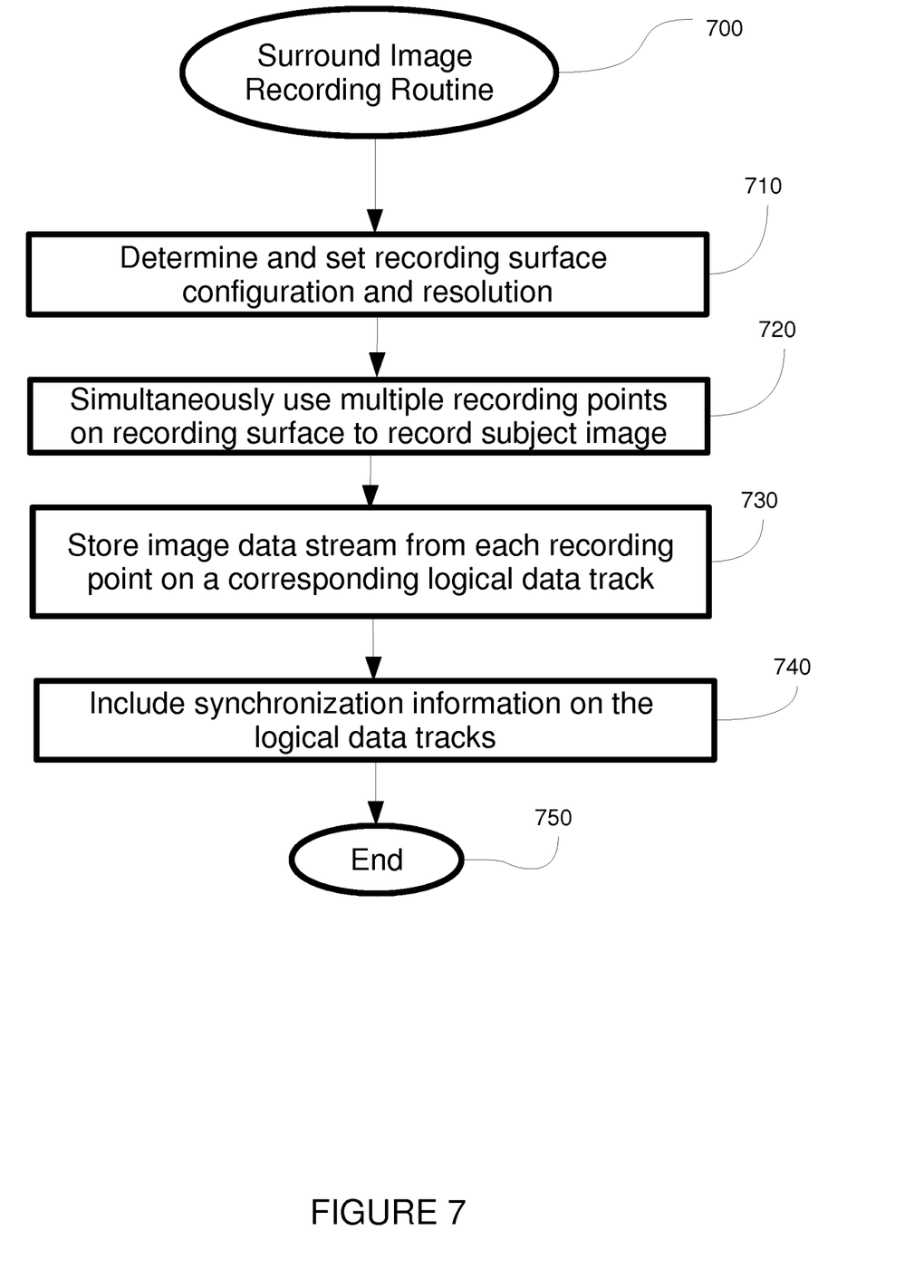
FIG. 7 shows an example flow diagram for a surround image recording routine.

FIG. 7 shows an example flow diagram for a surround image recording routine with simultaneously recording IADs. In various embodiments, and with reference to FIGS. 3 and 4, Routine 700 proceeds to block 710 where recording surface 410 or 430 and resolution of IADs are determined. In some embodiments, the recording surface substantially parallels the mounting matrix, while in other embodiments, the recording surface is different from the contours of the mounting matrix, for example, as shown in FIG. 4B. The resolution of IADs is generally dependent on the size of the IADs, the application, and the subject scene. For example, when full cameras are used as IADs, resolution is lower compared to when tiny cameras, image sensors only, or fiber optic elements are used, which may be packed more tightly on the mounting matrix. The routine proceeds to block 720.

At block 720, multiple IADs may be used to record a scene substantially simultaneously. In some embodiments, the multiple IADs are started simultaneously using a common start mechanism, such as a remote control device, to synchronize multiple recording streams. In some other embodiments, different image streams generated by different IADs are synchronized post recording using time or frame based methods described earlier. The routine proceeds to block 730.

At block 730, the multiple image streams are recorded each on a corresponding logical track. A logical track is a data track the data elements of which are not necessarily physically contiguous on a recording medium, such as a computer hard disk, optical disk, magnetic tape, and the like. Rather, each data element on the logical track has sufficient identifying information, such as pointers, data block numbers, and the like, that enables assembly of the related data elements into a whole data track in a predictable and controllable manner. If each image stream is stored on a separate logical track, then each image stream may be selected and played back on demand under user control. In some embodiments, all data from all image streams may be separably combined together as one physical data track, data file, or other data container, while in other embodiments, each image stream may be stored in a separate data container (for example, track on a disk, or data file) distinct from others. The routine proceeds to block 740.

At block 740, synchronization information is included with each image stream on the data storage. Such synchronization information may include a timestamp, a frame count, a frame rate, a combination of these information, and any other information needed to map a frame from one image stream to a corresponding frame in another image stream, which represent substantially the same time and/or frame in the recorded scene. The routine proceeds to block 750.

The routine terminates at block 750.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the disclosure.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems which perform the specified actions or steps, or combinations of special purpose hardware and computer instructions.

Changes can be made to the claimed invention in light of the above Detailed Description. While the above description details certain embodiments of the invention and describes the best mode contemplated, no matter how detailed the above appears in text, the claimed invention can be practiced in many ways. Details of the system may vary considerably in its implementation details, while still being encompassed by the claimed invention disclosed herein.

Particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the claimed invention to the specific embodiments disclosed in the specification, unless the above Detailed Description section explicitly defines such terms. Accordingly, the actual scope of the claimed invention encompasses not only the disclosed embodiments, but also all equivalent ways of practicing or implementing the claimed invention.

The above specification, examples, and data provide a complete description of the manufacture and use of the claimed invention. Since many embodiments of the claimed invention can be made without departing from the spirit and scope of the disclosure, the invention resides in the claims hereinafter appended. It is further understood that this disclosure is not limited to the disclosed embodiments, but is intended to cover various arrangements included within the spirit and scope of the broadest interpretation so as to encompass all such modifications and equivalent arrangements.

What is claimed is:

1. A surround video system comprising:
a two dimensional (2-D) mounting matrix;
a plurality of image acquisition devices (IAD) coupled with the mounting matrix, physically connected together via the mounting matrix, wherein the mounting matrix is one piece, and the plurality of IADs positioned at predetermined locations with respect to other IADs on the mounting matrix, wherein each IAD is configured to be positioned at an arbitrary distance from a plane of the mounting matrix, and wherein each IAD is further configured to acquire images from a subject scene or different takes of the subject scene to generate a corresponding image stream, each image stream having a unique identifier corresponding to the predetermined location of each IAD, and each image stream configured to be associated with other image streams to generate a multi-stream video, wherein no images from one stream is conbined with images from other streams to form a combined stream, permitting only images from one stream at a time, obtained by a corresponding IAD, to be played at a later time.

2. The surround video system of claim 1, wherein the mounting matrix is configured to change shape.

3. The surround video system of claim 1, wherein the mounting matrix comprises recording ports configured to hold the IADs and allow recording through the recording ports.

4. The surround video system of claim 3, wherein the recording ports are spaced sufficiently close to each other to allow smooth transition from one selected image stream to another selected image stream during playback of the multi-stream video.

5. The surround video system of claim 1, further comprising a central recording device.

6. The surround video system of claim 1, further comprising a central controller configured to control an operation of the IADs.

7. The surround video system of claim 6, wherein the central controller is coupled with each IAD via an addressable network.

8. The surround video system of claim 1, wherein the IADs include a video camera, an image sensor, and a fiber optic element.

9. A two dimensional (2-D) mounting matrix in a surround video system, the mounting matrix comprising:
a plurality of recording ports physically connected together via the 2-D mounting matrix,
wherein the mounting matrix is one piece; and
a plurality of image acquisition devices (IAD) coupled with the mounting matrix via the plurality of the recording ports, wherein the one-piece mounting matrix is configured to generate a recording surface by positioning the plurality of IADs around a subject scene, and wherein each of the plurality of IADs is configured to be positioned at arbitrary distances from a plane of the one-piece mounting matrix to form an arbitrary recording surface contour.

10. The mounting matrix of claim 9, further comprising a central recorder.

11. The mounting matrix of claim 9, further comprising a central controller networked with the IADs and configured to control the IADs.

12. The mounting matrix of claim 9, further comprising a movable platform configured to move the mounting matrix during active filming of the subject scene.

13. The mounting matrix of claim 9, further comprising a tension cable configured to change a curvature of the mounting matrix.

14. The mounting matrix of claim 9, wherein the IADs include a video camera, an image sensor, and an optic fiber element.

15. A method of video recording, the method comprising:
positioning a plurality of Image Acquisition Devices (IAD) at predetermined intervals with respect to each other around a subject scene, wherein each IAD is further coupled with and positioned at an arbitrary distance from a plane of an IAD two dimensional (2-D) mounting matrix, and wherein the plurality of IADs are physically connected together via the mounting matrix, and wherein the mounting matrix is one piece;
filming the subject scene via the plurality of IADs; and
generating a plurality of image streams, each image stream corresponding to one of the plurality of IADs, wherein each image stream is tagged to be distinguished from other image streams; and
associating the plurality of image streams together to generate one multi-stream video, wherein no images from one stream is combined with images from other streams to form a combined stream, permitting only images from one stream at a time, obtained by a corresponding IAD, to be played at a later time.

16. The method of claim 15, further comprising using a flexible mounting matrix to hold and position the plurality of the IADs.

17. The method of claim 15, further comprising using a central controller networked to each of the IADs to control each of the IADs.

18. The method of claim 15, wherein the plurality of IADs are positioned sufficiently close to each other to allow smooth transition from one selected image stream to another selected image stream during playback of the multi-stream video.

19. A method of video recording comprising:
recording a subject scene or multiple recordings of the subject scene from different directions via at least two Image Acquisition Device (IAD);
positioning each IAD at an arbitrary distance from a plane of a two dimensional (2-D) mounting matrix, wherein each IAD is coupled with the mounting matrix, and wherein the IADs are physically connected together via the mounting matrix, and wherein the mounting matrix is one piece;
generating a plurality of image streams, each image stream corresponding to one of the multiple recordings, wherein each image stream is tagged to be distinguished from other image streams and at least two of the image streams are simultaneously available to a user; and
associating together and synchronizing the recorded images into a multi-stream video, wherein no images from one stream is combined with images from other streams to form a combined stream, permitting only images from one stream at a time, obtained by a corresponding IAD, to be played at a later time.

20. The method of claim 19, further comprising two or more IADs, wherein each IAD records the subject scene from a different direction.

21. The method of claim 20, wherein one IAD records different takes of the subject scene from different angles.

* * * * *